Dec. 15, 1931.  M. SCHLING  1,836,686
WEED EXTERMINATOR
Filed June 2, 1928

INVENTOR
Max Schling
BY
ATTORNEY

Patented Dec. 15, 1931

1,836,686

UNITED STATES PATENT OFFICE

MAX SCHLING, OF NEW YORK, N. Y.

WEED EXTERMINATOR

Application filed June 2, 1928. Serial No. 282,432.

This invention relates to that class of agricultural implements used in the killing of undesirable vegetable growths, particularly such as are tenacious of life and which absorb nutriment from the soil to the detriment of cultivated plants, grasses, etc., infested by them.

The usual method of eradication consists in grubbing the objectional plant, as by a hoe or similar tool, at best a tiresome and time taking operation, and in the case of common weeds, such as dandelions and the like, unless the very last vestige of root be removed, the plant will multiply itself, by root propagation, thus completely defeating the object sought.

While it is commonly known that certain chemicals have a devastating effect upon such plant life, it has hitherto been exceedingly difficult to apply the same in proper quantity to the weeds without serious danger of destroying other adjacent desirable vegetation.

It is therefore an object of the present invention to provide an easily operated, convenient application for chemical solutions in which no loss occurs, and the possibility of dispensing the contents inappropriately is remote.

A further feature is in the provision of means for measuring the quantity of liquid in accordance with demand and for applying the same directly to such part of the plant as is most amenable, such applications being made with substantially no effort on part of an operator.

These several advantageous features are accomplished by the novel construction and combination of parts hereinafter described and shown in the accompanying drawings, forming a material part of this disclosure, and in which:—

Figures 1, 2, 3:
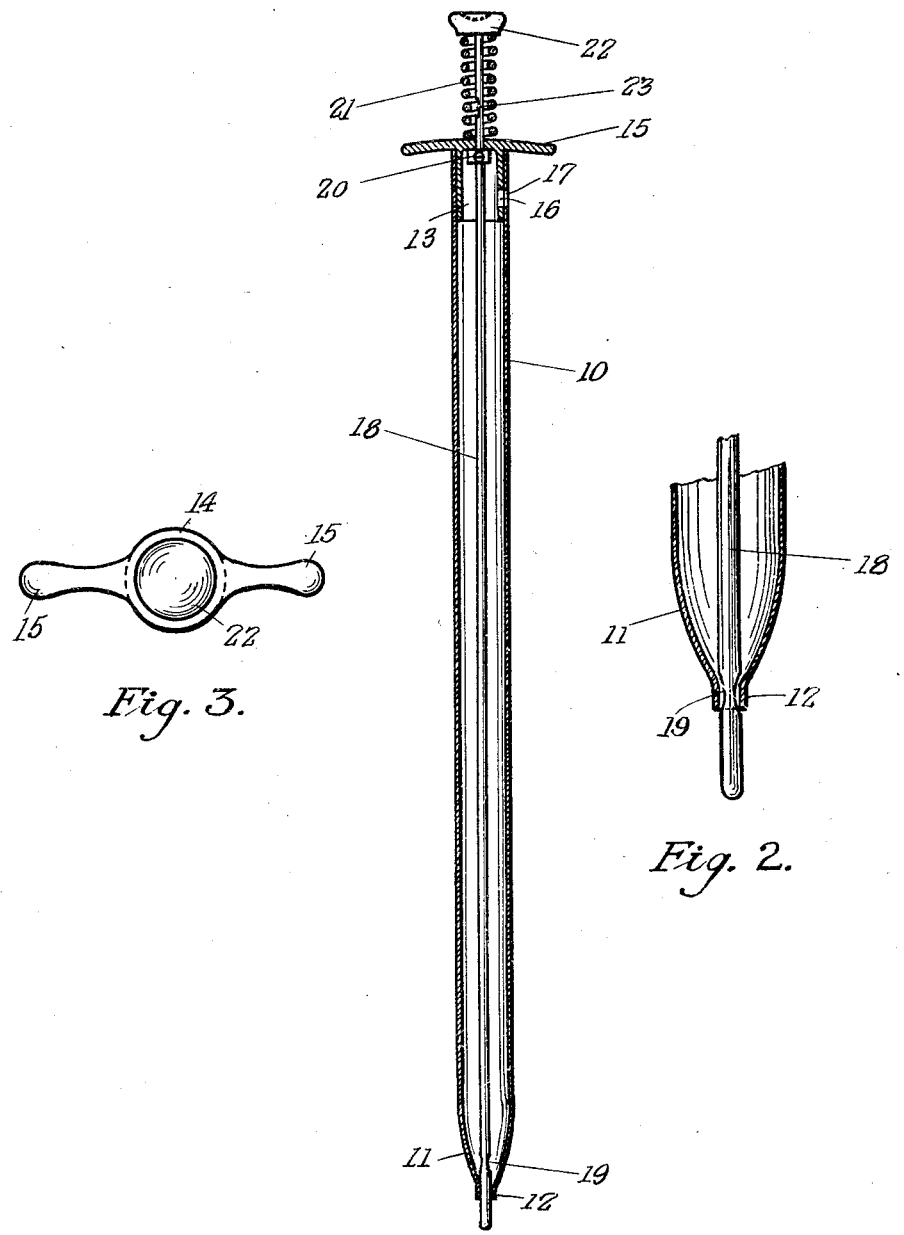
Fig. 1 is a longitudinal sectional view of an embodiment of the invention as shown in its normal position.
Fig. 2 is a fragmentary sectional view at the lower portion of the implement, shown in a position to permit passage of liquid, shown to an enlarged scale.
Fig. 3 is a top plan view of the device.

The device, which resembles a syringe in its general aspect, is composed of a cylindrical barrel 10, having a conically contracted lower portion 11 terminating in a cylindrical discharge nozzle 12.

Rotatably mounted in the opposite end of the barrel 10 is a hollow plug 13 formed centrally on a handle 14 having oppositely extending finger grips 15 curved slightly down as seen in Fig. 1.

An opening 16 in the wall of the plug 13 may be brought into registration with a similar opening 17 in the wall of the barrel 10, these openings serving to receive the end of a funnel used in filling the barrel as will be understood.

Passing through an axial opening in the handle 14 is a rod 18, its lower end portion extending outwardly beyond the nozzle 12 to which it is closely but freely fitted.

The fit between plug 13 and barrel 10 is much closer and tighter than the fit between the end of rod 18 and discharge nozzle 12, thus preventing parts 10 and 13 from separating when finger grips 15 are grasped and knob 22 is pressed down.

One or more recesses 19 are formed in the lower portion of the rod, in definite spaced relation to the nozzle to act as a valve in connection therewith as will later be seen.

Secured on the upper portion of the rod, within the hollow plug 13, is a stop collar 20 limiting the outward movement of the rod by making contact with the underside of the handle 14.

The continuing outer portion of the rod is encircled by a coiled compression spring 21, one end of which abuts the handle and its other end a knob 22 fixed on the extremity of the rod, the spring acting to raise the rod to its limit and close the opening through the nozzle 12.

Formed in the upper portion of the rod is an elongated notch or vent 23, which upon depression of the rod by pressing the knob downwardly, acts to admit air to the barrel as its liquid contents is dispensed through the nozzle such discharge taking place when the parts are in the position shown in Fig. 2, at which time a passage exists from the barrel, through the nozzle, by reason of the recesses 19.

In operation the barrel 10 is supplied with any chemical solution preferred, known to have a destructive effect upon plant life, and the handle thereafter turned relative to the barrel to bring the openings 16—17 into a non-registering position.

The device may be guided by one hand of an operator grasping the barrel, the fingers of the other hand engaging the handle arms 15 and the thumb applied to the knob 22, causing depression when desired.

It is found in practice that a few drops of a proper chemical solution applied to the flowers of such plants as the dandelion, find its way through the calyx, and stem to the roots, causing the same to wither and die shortly after an application has been made.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claim.

Having thus described my invention, what I claim as new and desire to secure by Letters Patent, is:—

A weed exterminator for applying a liquid comprising a barrel having a contracted end portion terminating in a discharge nozzle, a handle on the opposite end of said barrel, a rod journalled in said handle to extend through the nozzle, means in said rod co-operative with the nozzle to constitute a valve controlling the discharge of liquid, a spring raised knob on the opposite end of said rod, a stop limiting the outward movement of the rod, said stop and spring acting co-operatively to close the valve, an air vent in said rod to admit air to the barrel when the valve is in an open position by depression of said knob, and means for entering liquid into said barrel.

Signed at New York, in the county and State of New York, this 12th day of May, 1928.

MAX SCHLING.